(12) United States Patent
Yang et al.

(10) Patent No.: US 8,246,186 B2
(45) Date of Patent: Aug. 21, 2012

(54) LIGHT-GUIDE BOARD ASSEMBLY AND PORTABLE ELECTRONIC DEVICE USING SAME

(75) Inventors: Mu-Wen Yang, Taipei (TW); Chih-Chiang Chang, Taipei (TW)

(73) Assignee: FIH (Hong Kong), Kowloon (HK)

( * ) Notice: Subject to any disclaimer, the term of this patent is extended or adjusted under 35 U.S.C. 154(b) by 296 days.

(21) Appl. No.: 12/636,871

(22) Filed: Dec. 14, 2009

(65) Prior Publication Data
US 2010/0163379 A1    Jul. 1, 2010

(30) Foreign Application Priority Data

Dec. 31, 2008   (CN) .......................... 2008 1 0306745

(51) Int. Cl.
*F21V 1/00* (2006.01)

(52) U.S. Cl. ......... 362/23; 362/604; 362/97.1; 362/97.2

(58) Field of Classification Search .................... 362/23, 362/97.1–97.3, 600–632
See application file for complete search history.

(56) References Cited

U.S. PATENT DOCUMENTS

| | | | |
|---|---|---|---|
| 6,590,508 B1 * | 7/2003 | Howell et al. | 341/22 |
| 7,283,066 B2 * | 10/2007 | Shipman | 341/22 |
| 2006/0145887 A1 * | 7/2006 | McMahon | 340/815.45 |

* cited by examiner

*Primary Examiner* — Anabel Ton
(74) *Attorney, Agent, or Firm* — Altis Law Group, Inc.

(57) ABSTRACT

A light-guide board assembly includes a light-guide board, a shielding board disposed on the light-guide board, and a plurality of light-guide poles. The light-guide board defines a plurality of engaging holes, a plurality of light-focusing slots and a plurality of channels. One end of each light-guide pole is received in a corresponding engaging hole. The light-focusing slots focus light to strengthen the light emitted from the light-guide slots. Each engaging hole communicates with one adjacent engaging hole or an adjacent light-focusing slot through a channel.

5 Claims, 4 Drawing Sheets

LIGHT-GUIDE BOARD ASSEMBLY AND PORTABLE ELECTRONIC DEVICE USING SAME

BACKGROUND

1. Technical Field

The present disclosure relates to light-guide board assemblies and, particularly, to a light-guide board assembly used in a portable electronic device.

2. Description of Related Art

To enable portable electronic devices used in dark, a light-guide board assembly is applied on the portable electronic device to light up keypads. The typical light-guide assembly includes a lamp, e.g, a light emit diode (LED) and a light-guide board. The lamp emits light, and the light is guided to the keypad by the light-guide board.

However, the resulting light may be uneven.

Therefore, there is room for improvement within the art.

BRIEF DESCRIPTION OF THE DRAWINGS

Many aspects of a light-guide board assembly and a portable electronic device can be better understood with reference to the following drawings. These drawings are not necessarily drawn to scale, the emphasis instead being placed upon clearly illustrating the principles of the present light-guide board assembly and portable electronic device. Moreover, in the drawings like reference numerals designate corresponding sections throughout the several views.

DETAILED DESCRIPTION

The present light-guide board is suitable for a portable electronic device e.g., a mobile phone and a personal digital assistant. In this embodiment, the light-guide board is used in a mobile phone.

Figure 1:
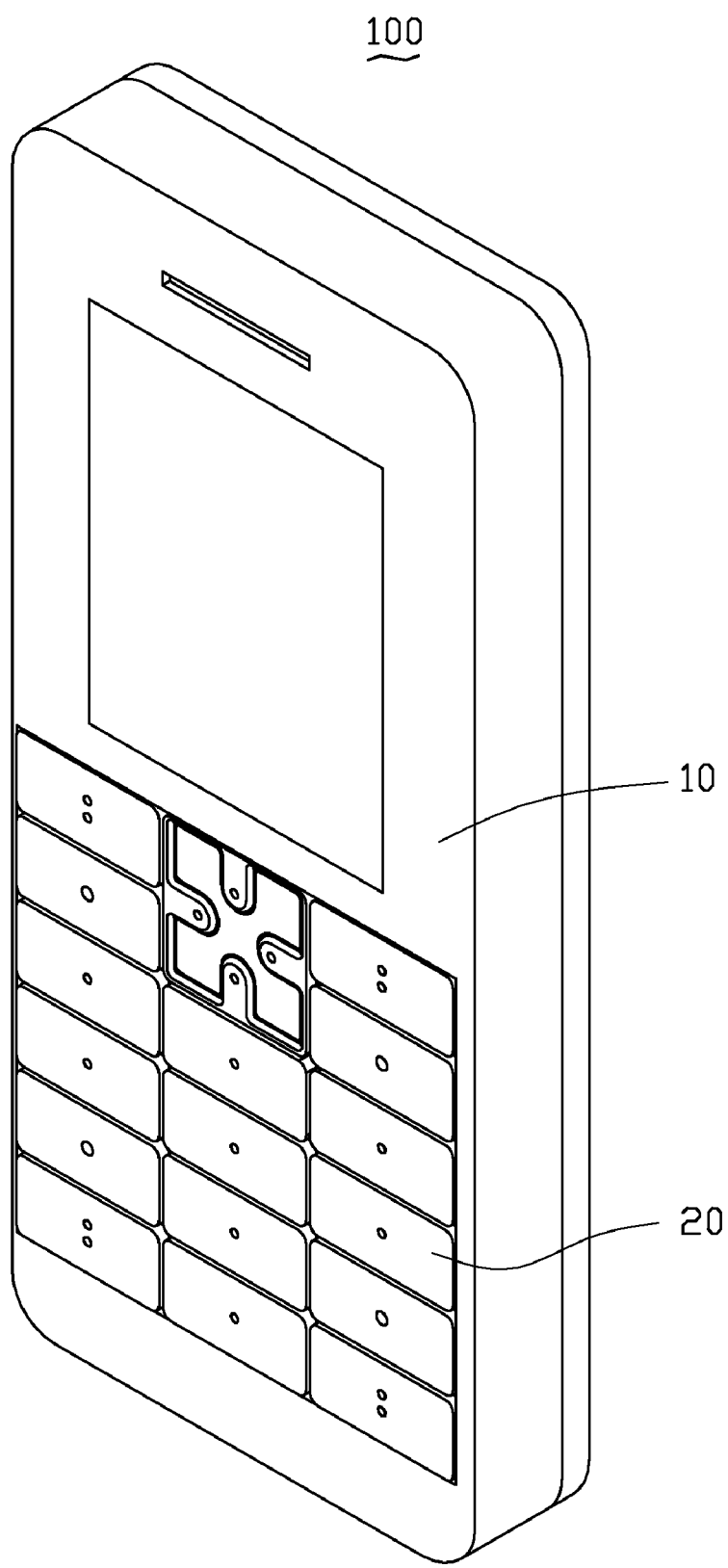
FIG. 1 is an isometric view of a portable electronic device incorporated with a light-guide board assembly, in accordance with an exemplary embodiment.

FIG. 1 shows an exemplary mobile phone 100 including a housing 10 and a keypad module 20 mounted on the housing 10.

Figure 2:
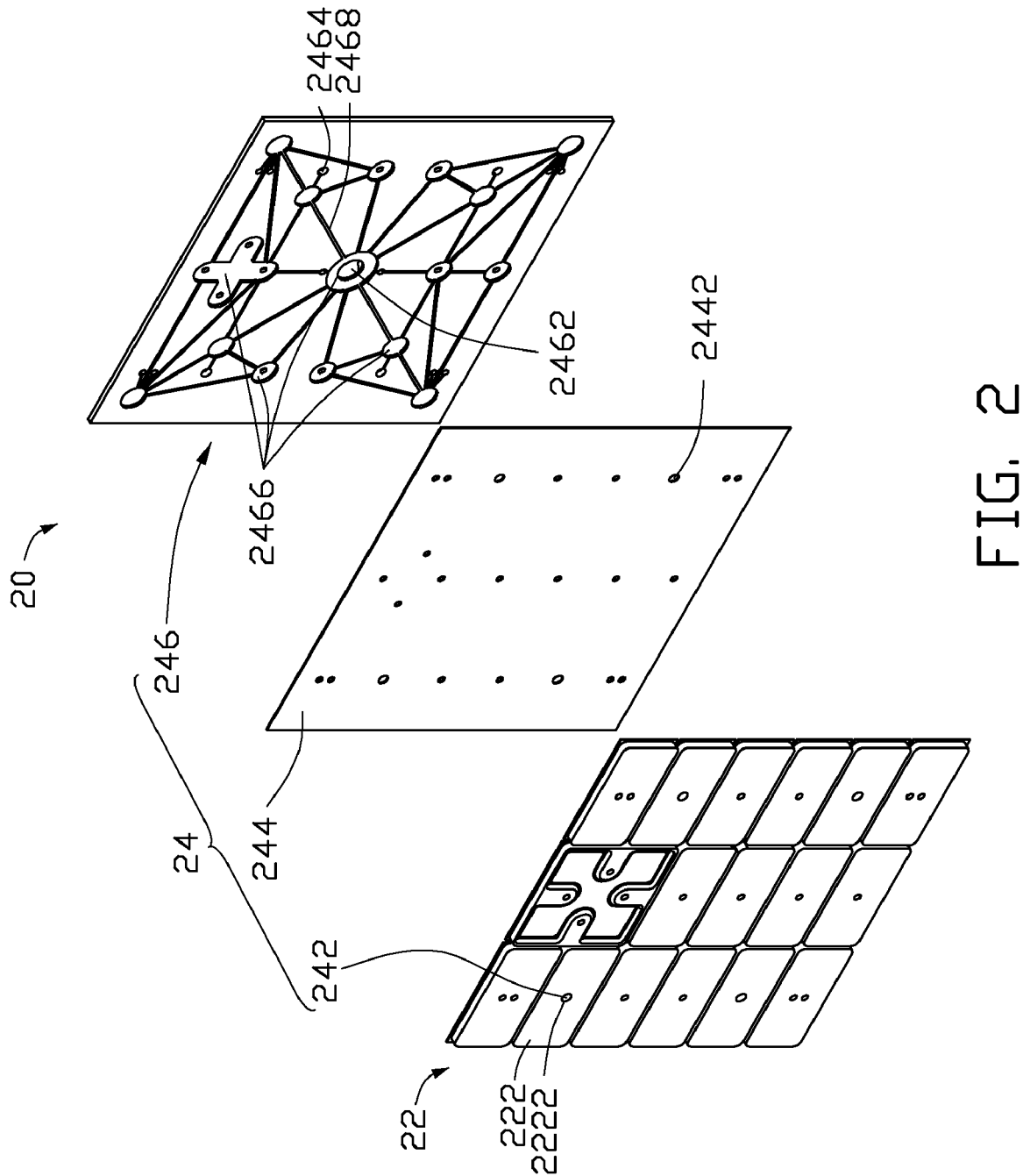
FIG. 2 is an isometric, exploded view of the keypad shown in FIG. 1.
Figure 3:
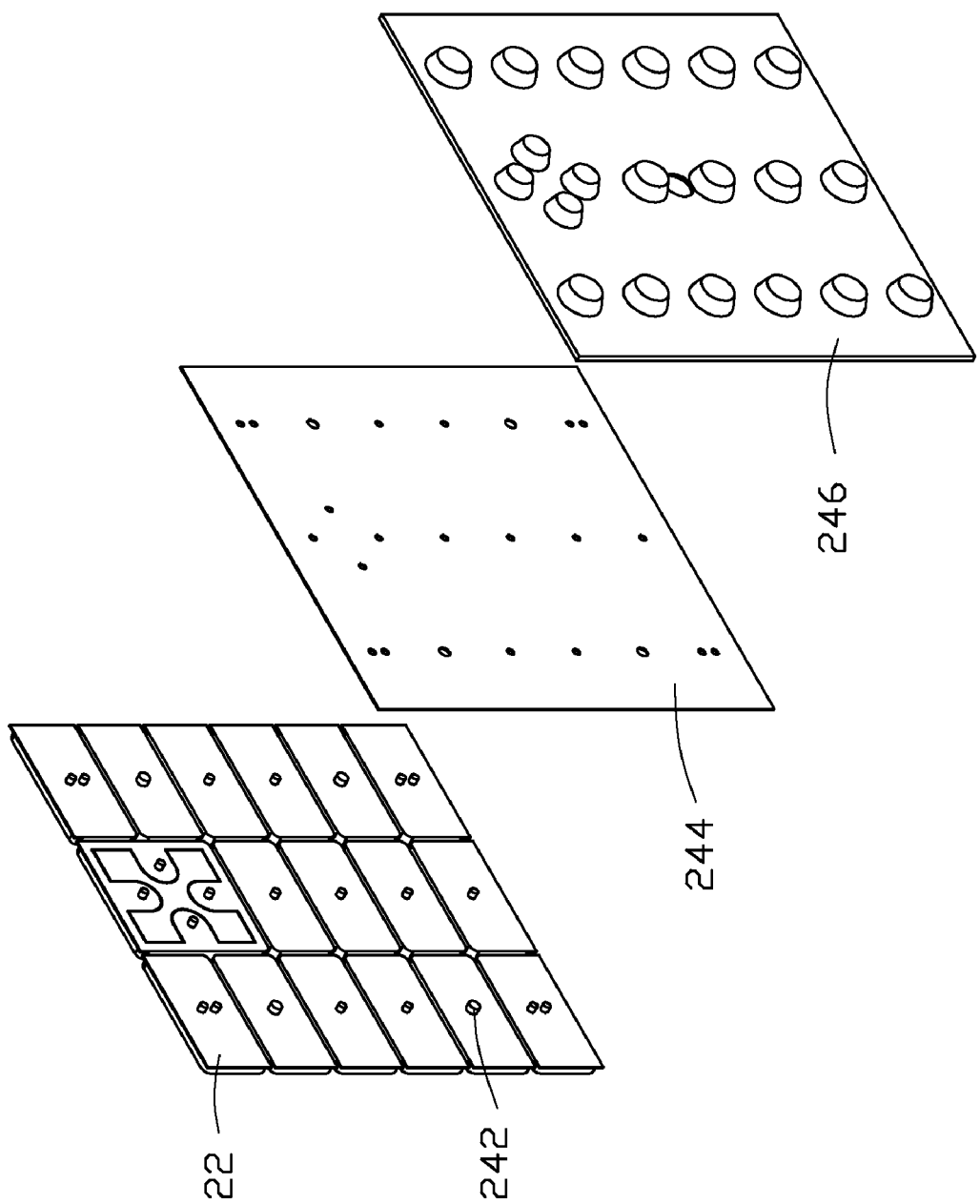
FIG. 3 is similar to FIG. 2, but viewed from another aspect.
Figure 4:
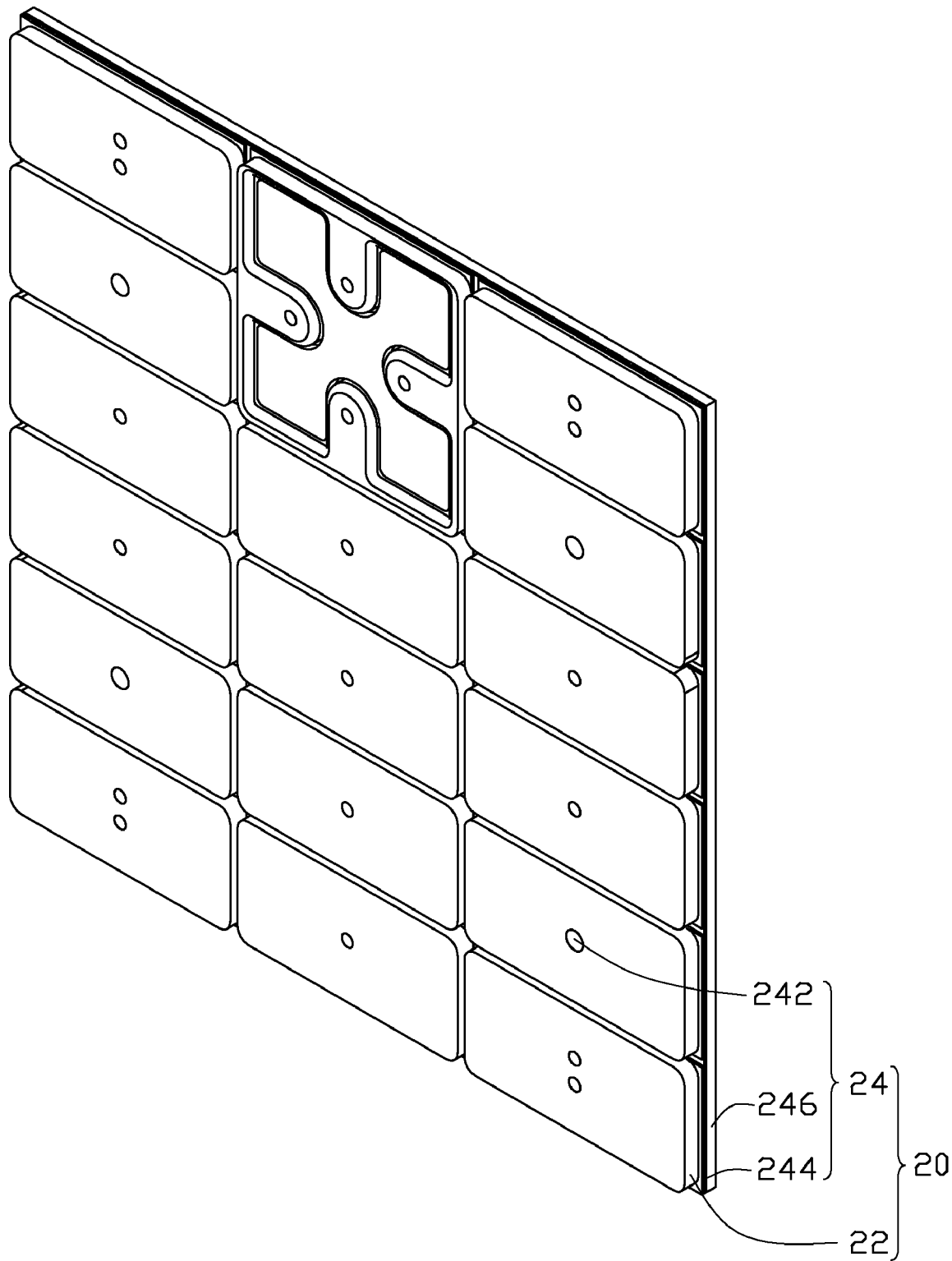
FIG. 4 is an assembled view of the keypad shown in FIG. 2.

Referring to FIGS. 2 and 3, the keypad module 20 includes a keypad board 22 and a light-guide board assembly 24 mounted to the keypad board 22. The light-guide board assembly 24 is configured to shine the keypad board 22.

The keypad board 22 includes a plurality of keys 222. Each key 222 can be printed with indica, e.g., 1, 2, 3, representing the function of the key 222. Each key 222 defines a through receiving cavity 2222.

Referring to FIG. 3, the light-guide board assembly 24 includes a plurality of light-guide poles 242, each pole corresponding to one of the receiving cavities 2222, a shielding board 244, and a light-guide board 246. The number of the light-guide poles 242 is generally the same as that of the receiving cavities 2222. Each light-guide pole 242 is received in a corresponding receiving cavity 2222 in typical means, e.g., hot-melt or molding.

The shielding board 244 defines a plurality of holes 2442, corresponding to the light-guide poles 242. Each light-guide pole 242 passes through one corresponding hole 2442. The shielding board 244 is made of opaque material, e.g., a black resin.

The light-guide board 246 defines a securing hole 2462 at a center. The light-guide board 246 further defines a plurality of engaging holes 2464 and a plurality of light-focusing slots 2466. Each engaging hole 2464 communicates with one adjacent engaging hole 2464 or an adjacent light-focusing slot 2466 through a channel 2468. Each light-focusing slot 2466 communicates with one adjacent light-focusing slot 2466 or engaging hole 2464 through a channel 2468.

The securing hole 2462 is used for receiving a lamp therein. The lamp may be a light-emitting diode (LED) (not shown). The number of the engaging holes 2464 is generally the same as the number of light-guide poles 242, and the other end of each light-guide pole 242 is received in a corresponding engaging hole 2464. The position of the light-focusing slots 2466 can be changed according to need. The light-focusing slots 2466 focus light emitted from the lamp. In this exemplary embodiment, some light-focusing slots 2466 surround the engaging holes 2464 or the securing hole 2462, and other light-focusing slots 2466 are defined single in the light-guiding board 246, and communicate with an adjacent engaging hole 2464 or other light-focusing slots 2466 through channels 2468. The light-guide board 246 is made of opaque material, such as a black resin.

In assembly, the shielding board 244 is mounted to the light-guide board 246, at this time, the hole 2442 of the shielding board 244 is aligned with one corresponding engaging hole 2464 of the light-guide board 246. One end of each light-guide pole 242 is inserted into one of the corresponding receiving holes 2222 of the keypad board 22. The light-guide pole 242 is aligned with the hole 2442, and then pressed towards the hole 2442 until the light-guide pole 242 passes through the hole 2442 and received in the engaging hole 2464.

It is to be understood, an adhesive can be applied between the keypad board 22 and the shielding board 244, thus adhering the keypad board 22 to the shielding board 244.

In use, the lamp is received in the securing hole 2462 of the light-guide board 246, thus light emitted from the lamp is focused in the light-focusing slot 2466 surrounding the securing hole 2462, and then transmitted to other light-focusing slot 2466 or engaging holes 2464 through a channel 2468. The light-guide pole 242 and keys 222 can be illuminated.

The keypad module 20 can focus light via the light-focusing slot 2466, thus strengthen the light of the keypad module 20. Furthermore, the shielding board 244 can efficiently prevent light from leaking out of the mobile phone 100.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A light-guide board assembly comprising:
   a light-guide board defining a securing hole, a plurality of engaging holes, a plurality of light-focusing slots and a plurality of channels, the securing hole defined at a center of the engaging holes, the light-focusing slots and the channels, light emitted from the securing hole;
   a flat shielding board disposed on the light-guide board, the shielding board defining a plurality of holes aligned with the engaging holes; and a plurality of light-guide poles, one end of each light-guide pole being received in a corresponding engaging hole, another end of each light-guide pole extending through a corresponding hole of the shielding board, the light-focusing slots focusing the light from the securing hole to strengthen the light emitted from the light-guide slots, each engaging hole communicating with one adjacent engaging hole or an adjacent light-focusing slot through a channel.

2. The light-guide board assembly as claimed in claim 1, wherein the light-guide board and the shielding board are made of opaque material, and the opaque material is a black resin.

3. The light-guide board assembly as claimed in claim 1, wherein each light-focusing slot communicates with an adjacent light-focusing slot or engaging hole through a channel.

4. The light-guide board assembly as claimed in claim 1, wherein the shielding board prevents light from leaking out of the light-guide slots.

5. A portable electronic device comprising:
 a housing; and
 a keypad module disposed on the housing, the keypad module comprising:
  a keypad board defining a plurality of keys exposed from the housing, each key defining a through receiving cavity;
  a shielding board defining a plurality of holes;
  a light-guide board defining a securing hole at a center, and a plurality of engaging holes, a plurality of light-focusing slots and a plurality of channels, the holes aligned with the engaging holes;
  a lamb received in the securing hole; and
  a plurality of light-guide poles, one end of each light-guide pole being inserted into a corresponding through receiving cavity of the keypad board, another end of each light-guide pole extending through a corresponding hole of the shielding board, and mounted in a corresponding engaging hole;
 wherein each engaging hole communicates with one adjacent engaging hole or an adjacent light-focusing slot through a channel, the light-focusing slots focuses light from the lamb to strengthen the light emitted from the light-guide slots, and transmits the light to the engaging holes, the light passes through the light-guide pole for illuminating the keys.

\* \* \* \* \*